(12) United States Patent
Raksha et al.

(10) Patent No.: US 8,211,509 B2
(45) Date of Patent: *Jul. 3, 2012

(54) ALIGNMENT OF PASTE-LIKE INK HAVING MAGNETIC PARTICLES THEREIN, AND THE PRINTING OF OPTICAL EFFECTS

(76) Inventors: Vladimir P. Raksha, Santa Rosa, CA (US); Dishuan Chu, Rohnert Park, CA (US); Thomas Mayer, Santa Rosa, CA (US); Charles T. Markantes, Santa Rosa, CA (US); Paul G. Coombs, Santa Rosa, CA (US)

(*) Notice: Subject to any disclaimer, the term of this patent is extended or adjusted under 35 U.S.C. 154(b) by 779 days.

This patent is subject to a terminal disclaimer.

(21) Appl. No.: 11/252,681

(22) Filed: Oct. 18, 2005

(65) Prior Publication Data

US 2006/0081151 A1    Apr. 20, 2006

Related U.S. Application Data

(63) Continuation-in-part of application No. 11/022,106, filed on Dec. 22, 2004, now Pat. No. 7,517,578, which is a continuation-in-part of application No. 10/386,894, filed on Mar. 11, 2003, now Pat. No. 7,047,883.

(60) Provisional application No. 60/620,471, filed on Oct. 20, 2004, provisional application No. 60/633,463, filed on Dec. 6, 2004, provisional application No. 60/410,546, filed on Sep. 13, 2002, provisional application No. 60/410,547, filed on Sep. 13, 2002, provisional application No. 60/396,210, filed on Jul. 15, 2002.

(51) Int. Cl.
| | |
|---|---|
| H01F 1/00 | (2006.01) |
| B29C 35/08 | (2006.01) |
| B05D 5/06 | (2006.01) |
| B05D 5/12 | (2006.01) |
| B05D 1/12 | (2006.01) |
| B05D 5/00 | (2006.01) |
| B05D 1/32 | (2006.01) |
| B05D 1/06 | (2006.01) |
| H05C 1/00 | (2006.01) |
| B44F 1/12 | (2006.01) |
| B29C 67/00 | (2006.01) |

(52) U.S. Cl. ........ 427/547; 427/598; 427/162; 427/472; 427/473; 427/474; 427/7; 427/180; 427/197; 427/466; 427/469; 264/437; 264/438

(58) Field of Classification Search .................. 427/547, 427/598
See application file for complete search history.

(56) References Cited

U.S. PATENT DOCUMENTS 3,465,307 A * 9/1969 Schmidt ........................ 365/173
(Continued)

FOREIGN PATENT DOCUMENTS

EP    1 353 197    10/2003
(Continued)

OTHER PUBLICATIONS

None, "nonviscous" definition, accessed Jul. 18, 2011, Dictonary. com, <http://dictionary.reference.com/browse/nonviscous>.*

Primary Examiner — Timothy Meeks
Assistant Examiner — Mandy Louie
(74) Attorney, Agent, or Firm — Matthew A. Pequignot; Pequignot + Myers LLC

(57) ABSTRACT

A method and apparatus is provided for printing using paste like inks such as those used in intaglio printing, wherein the inks include specialty flakes such as thin film optically variable flakes, or diffractive flakes. The invention discloses an apparatus having an energy source such as a heat source for temporarily lessening the viscosity of the ink during alignment of the flakes within the ink.

15 Claims, 3 Drawing Sheets

U.S. PATENT DOCUMENTS

| | | | | |
|---|---|---|---|---|
| 3,878,367 A * | 4/1975 | Fayling et al. | | 360/131 |
| 3,998,160 A | 12/1976 | Pearce | | 101/488 |
| 4,007,042 A * | 2/1977 | Buckley et al. | | 430/41 |
| 4,009,028 A * | 2/1977 | Goffe | | 430/19 |
| 4,239,959 A * | 12/1980 | Gutterman | | 235/493 |
| 5,045,865 A * | 9/1991 | Crystal et al. | | 347/114 |
| 5,364,689 A | 11/1994 | Kashiwagi et al. | | 428/195.1 |
| 5,382,282 A * | 1/1995 | Pennaz | | 106/31.74 |
| 5,693,375 A | 12/1997 | Sato et al. | | 427/522 |
| 5,817,205 A * | 10/1998 | Kaule | | 156/233 |
| 6,114,018 A | 9/2000 | Phillips et al. | | 428/200 |
| 6,294,010 B1 * | 9/2001 | Pfaff et al. | | 106/415 |
| 6,403,169 B1 * | 6/2002 | Hardwick et al. | | 427/548 |
| 6,808,806 B2 | 10/2004 | Phillips et al. | | |
| 6,815,065 B2 | 11/2004 | Argoitia et al. | | |
| 6,833,395 B2 | 12/2004 | Rygas et al. | | |
| 6,838,166 B2 | 1/2005 | Phillips et al. | | 428/323 |
| 6,902,807 B1 | 6/2005 | Argoitia et al. | | |
| 7,604,855 B2 * | 10/2009 | Raksha et al. | | 428/195.1 |
| 2002/0182383 A1 | 12/2002 | Phillips et al. | | 428/199 |
| 2003/0165637 A1 * | 9/2003 | Phillips et al. | | 427/598 |
| 2004/0009309 A1 | 1/2004 | Raksha et al. | | 427/598 |
| 2004/0051297 A1 | 3/2004 | Raksha et al. | | 283/57 |
| 2005/0106367 A1 | 5/2005 | Raksha et al. | | |
| 2006/0083694 A1 * | 4/2006 | Kodas et al. | | 424/46 |

FOREIGN PATENT DOCUMENTS

| | | | |
|---|---|---|---|
| EP | 1 741 757 | | 1/2007 |
| WO | WO9856596 | * | 12/1998 |
| WO | WO 2005/017048 | | 2/2005 |

* cited by examiner

ALIGNMENT OF PASTE-LIKE INK HAVING MAGNETIC PARTICLES THEREIN, AND THE PRINTING OF OPTICAL EFFECTS

CROSS-REFERENCE TO RELATED APPLICATIONS

This application is a continuation-in-part application of U.S. patent application Ser. No. 11/022,106, filed Dec. 22, 2004 now U.S. Pat. No. 7,517,578, now published application 2005/0106367 which is a continuation-in-part of U.S. patent application Ser. No. 10/386,894 filed Mar. 11, 2003, now issued U.S. Pat. No. 7,047,883, which claims priority from U.S. Provisional Patent Application Ser. No. 60/410,546 filed Sep. 13, 2002, from U.S. Provisional Patent Application Ser. No. 60/410,547 filed Sep. 13, 2002, and from U.S. Provisional Patent Application Ser. No. 60/396,210 filed Jul. 15, 2002. This application claims priority from U.S. Patent Application No. 60/620,471 filed Oct. 20, 2004 and 60/633,463 filed Dec. 6, 2004, which are incorporated herein by reference.

FIELD OF THE INVENTION

This invention relates to a method and apparatus for orientating pigment particles dispersed in a highly viscous carrier such that the particles align and remain in a preferred orientation, and to images made by said method.

Intaglio printing is a well known printing method using a printing plate having recesses formed in printing image areas with respect to non-printing image areas. After the entire intaglio printing plate is filled with a highly viscous ink, the ink on the non-printing image areas is wiped off to leave the ink only in the printing image areas. Thereafter, a web or substrate such as a paper sheet is forced directly to the printing plate under heavy pressure to transfer the ink remaining in the printing image areas onto the paper. Line-engraved intaglio printing is typically used for printing security documents, such as banknotes, and uses printing cylinders having engravings therein in which intaglio printing inks have been deposited. The highly viscous paste-like intaglio inks used in such printing are substantially different in nature from inks used in other forms of printing such as gravure, offset and ink-jet printing. To varying degrees of success, attempts have been made to improve the dispersibility and chemical resistance of the paste-like intaglio inks; for example U.S. Pat. No. 6,833,395 in the name of Rygas et al. assigned to the Canadian Bank Note Company, Limited (Ottawa, Canada) attempts to provide a solution to this problem.

Another United States patent that relates to enhancements within an intaglio printed image and suggesting the addition of dielectric flakes within the intaglio ink, is U.S. Pat. No. 6,815,065, in the name of Argoitia et al., assigned to Flex Products Inc, incorporated herein by reference. The '065 patent discloses drawing down ink or paint which generally flattens the pigment flakes in the plane of the surface of the substrate.

As of late there has been considerable interest in obtaining special effects by magnetically orienting magnetic flakes, that is, flakes that will align in a magnetic field, in a predetermined manner, to follow the field lines. Examples are found in U.S. Pat. No. 6,902,807 in the names of Argoitia et al., entitled Alignable diffractive pigment flakes, and U.S. Pat. No. 6,808,806 in the names of Phillips et al., entitled Methods for producing imaged coated articles by using magnetic pigments; Phillips et al., disclose orienting magnetically orientable flakes in applied magnetic fields to achieve special effects; both of these patents are incorporated herein by reference.

Printing of secure labels and valuable documents with illusive optical effects based on utilization of low-viscosity magnetic optically variable flexo and silk-screen inks, is described in details in US Patent Application 20040051297 assigned to Flex Products Inc., is incorporated herein by reference.

Optically variable prints for other security documents and currencies are often printed on sheet-fed intaglio presses. The printing process involves enormous pressures (tons/sq-in) on the paper in the ink transfer from the plate, high press speeds (200-500 ft/min), ultra viscous nature of the ink, and fast kinetics of the surface drying.

Intaglio printing of security insignias is employed because of the unique properties that can be attained. The achievement of these special properties places strict requirements on the ink, the engraved plate, and the process conditions employed. For example, after completion of printing the ink must maintain a specific morphology and configuration i.e. separate islands or strings that accurately replicate the fine detail of the parent engraving. Therefore, the conventional steps of printing and curing and the new steps of aligning must still provide the same physical, chemical, and mechanical properties to the cured ink while at the same time enabling the accurate reproduction of the engraved image and predetermined position of magnetic particles. The concomitant requirements of stringently maintaining the correct visco-elastic properties of the paste-like ink while enabling a sequence of new and added steps to cause alignment of magnetic flakes presented a tremendous challenge to those skilled in the art.

The achievement of printed and cured insignias encompassing magnetic flakes that have been aligned in a desired and predetermined manner requires a solution that overcomes a difficult set of constraints. For example, the paste-like ink must be able to provide not only the normal drop and rise in viscosity that results from the printing step but must also be capable of surviving a second drop and rise in viscosity during the new alignment step. Complicating matters, the second viscosity spike takes place after application of ink to substrate rather than in the fluid state. To support high-speed printing, the printed but uncured ink must provide this viscosity drop-rise quickly so as not to slow down the line speed of the press. In the high-speed example, the magnetic flakes must orient quickly in the dwell time provided by the magnet apparatus—sometimes in less than one second. Once in the desired position, the flakes must freeze in place and avoid the natural relaxation that will occur unless the proper steps are followed. This fixing of the flake position must be permanent and must survive the lifetime of the security document—a period of years in the case of a circulating banknote.

Besides requirements placed on the ink, the magnets, and the magnetic flakes, the process is additionally constrained. For example, when energy is applied to the ink to reduce viscosity, the energy must be applied in a manner and with an amplitude sufficient to cause the desired change to the ink without damaging the materials involved with the process. For example, the heat or other energy must not scorch or damage the ink or the substrate—usually paper or polymer. The added energy must not damage the printing press. The type of energy must be compatible with the mechanical hardware in the alignment zone. For example, application of microwave energy to a press zone containing metallic elements could be hazardous.

Thus, when one attempts printing using thick, highly viscous paste-like inks having magnetic flakes or particles therein, alignment of these flakes using standard intaglio-like processes and inks is less than satisfactory as the high-viscosity of the paste-like ink prevents the magnetically alignable flakes from moving and reorienting within the carrier; therefore, heretofore, alignment using an applied magnetic field with highly viscous paste-like inks has not been practicable.

It is therefore an object of this invention to provide a method and apparatus that will allow these highly viscous paste-like inks to be utilized in the printing of special effect pigments wherein the pigments can be aligned in preferred orientations using a magnetic field so as to yield desired illusionary effects.

It is a further object of this invention to provide magnetically orientable flakes fixedly oriented in a preferred orientation wherein the flakes are initially disposed in a paste-like ink having a viscosity of at least 100-200 Pa·s when the ambient temperature is in a range of 15-30 degrees C.

SUMMARY OF THE INVENTION

In accordance with this invention there is provided, a method of printing and aligning special effect flakes such that at least some of the printed flakes orient along field lines of an applied field, the method comprising the steps of:
a) providing a paste-like ink, which has a viscosity V of at least 100 Pa·s when at a temperature of between 15 and 25 degrees C., wherein the paste-like ink is comprised of a carrier having flakes therein and wherein the flakes are comprised of at least a layer of magnetically orientable material;
b) applying the paste like ink by printing said ink upon a substrate;
c) decreasing the viscosity V of the paste-like ink by at least 60% for at least a time sufficient for applying a magnetic or electric field to the printed ink, so as to allow the flakes to align within the paste-like ink along field lines of the electric or magnetic field; and,
d) applying a magnetic or electric field to the printed ink to align the flakes.

In accordance with the invention there is provided a method of printing and aligning special effect flakes such that at least some of the printed flakes orient along field lines of an applied field, the method comprising the steps of:
a) providing a paste-like ink having a viscosity V at an ambient temperature, wherein the paste-like ink is comprised of carrier having flakes therein and wherein the flakes are comprised of at least a layer of magnetically orientable material; b) applying the paste like ink by printing said ink upon a substrate;
b) decreasing the viscosity V of the paste-like ink substantially and by a sufficient amount, for at least a time sufficient for applying a magnetic or electric field to the printed ink, so as to allow the flakes to align within the paste-like ink along field lines of the electric or magnetic field; and,
c) applying a magnetic or electric field to the printed ink to align the flakes.

In accordance with the invention, a product is formed wherein flakes are reoriented in a predetermined manner using a magnetic field or electric field and wherein the viscosity of the ink is lessened by adding energy to the ink during the time when the flakes are reoriented or immediately before the time when the flakes are reoriented.

In accordance with the invention, pigment flakes are printed on a substrate and oriented using an intaglio process and a magnetic alignment process wherein the intaglio ink having magnetically orientable flakes therein, undergoes a transition and is made less viscous during the alignment process than it is prior to be printed.

In accordance with this invention, viscous paste-like ink is applied through a conventional printing process and a step of adding energy to the ink, such as thermal energy after printing or during printing to lessen the viscosity of the ink, so that magnetic flakes within the ink can be oriented in a magnetic or electric field along field lines.

DETAILED DESCRIPTION

For printing of securities and high-value documents a novel process is provided, which allows paste-like ink having magnetic platelets or flakes dispersed therein to be oriented in a magnetic field. The paste-like viscous ink preferably comprises flakes of optical interference pigment, or flakes of a reflective pigment, or single layer or multi layer diffractive pigment flakes having magnetic properties. This invention similarly lends itself to any alignment method wherein flakes can be aligned in a preferred orientation using any forces that are practicable. For example, particles movable in electric fields that can force the special effect flakes in a desired orientation, may benefit from this invention, wherein paste-like printing inks having flakes therein can be temporarily made less viscous during alignment.

In one example, the interference pigment is an optically variable pigment that contains a thin layer of magnetic material surrounded by an aluminum layer as well as a thin layer of dielectric separating the magnetic layer from the aluminum. The pigment is dispersed in a high-viscosity carrier that may contain additional solvents or a cure retarder to keep the ink layer fluid during transition of the print through the magnetic zone; preferably in the range of 4-40 Pa·s at the temperature of 40° C. or more. Printing of the image with magnetic paste-like ink occurs in the press where magnets are either embedded into the impression cylinder or located as close to the impression cylinders as possible.

Conceptually, the ideal environment for an illusionary optical effect, generated in an applied magnetic field, is the one that maximizes the dwell time of a "fluid" ink layer in a region of high magnetic flux concentration, coupled with a vehicle system that has the correct visco-elastic properties to allow for magnetically permeable flakes to orient during the time spent in the magnetic zone.

Figure 1:
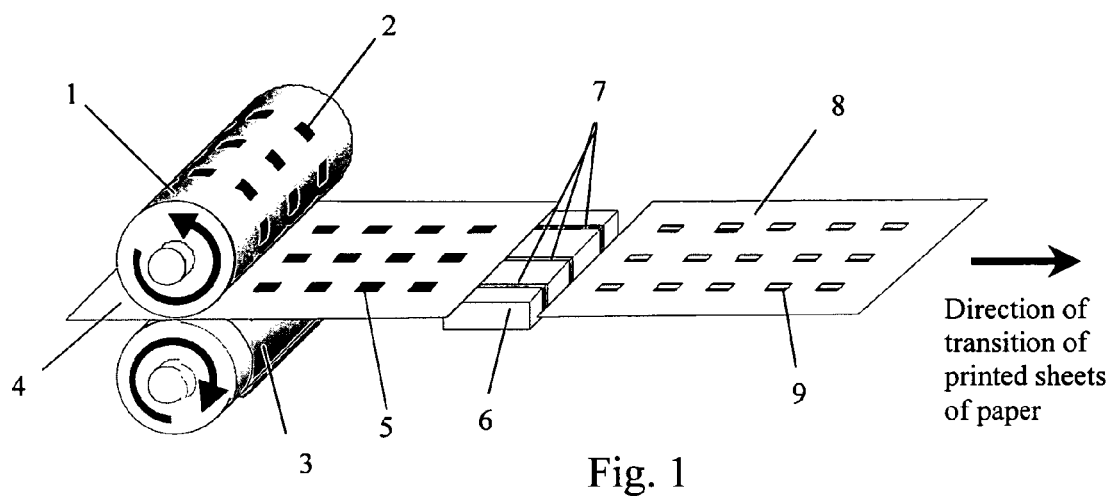
FIG. 1 is a schematic diagram illustrating an intaglio printing process in accordance with an embodiment of the invention, wherein a magnetic field is disposed adjacent a print roller and wherein a heat source is provided to temporarily lessen the viscosity of the ink prior to alignment of flakes within the ink.

In a first embodiment of this invention, the printing press is equipped with magnetic hardware for providing an illusionary optical effect. Typically, illusionary optical effects are achieved by alignment of flakes dispersed in a liquid ink vehicle along lines of an applied magnetic field in a predetermined, varying manner, for example such that some of the flakes are purposely oriented differently than others. For example, some flakes may be standing on their edges, while others may be lying flat, and, or, some flakes may be tilted to varying degrees between flat lying and edge standing flakes. The hardware is placed directly down the web as is shown in FIG. 1 and as close to the printing and impression cylinders as possible. Sheets of freshly printed optically variable ink are conveyed over the magnetic lines, with a vertical separation between the magnet surface and the ink surface no greater than about 1 inch. The freshly deposited ink is either still fluid enough after the application of sufficient heat energy to allow the magnetic pigment particles, dispersed in the ink vehicle, to align themselves parallel to the applied field lines or, alternatively, the paste-like viscous ink is heated so as to be re-fluidized immediately before the magnetic hardware. In FIG. 1 printing roller 1 has number of engravings 2 in the shape of a desired image on the printing plate wrapping the roller. Printing roller 1 and impression roller 3 touch each other and rotate in opposite directions. A web in the form of a sheet of paper 4, inserted between the rollers, moves from the left to the right. The web could alternatively take the form of a continuous roll of paper, film, or polymer. The moment when the paper is positioned exactly between the rollers, an engraving holding the paste-like ink comes to this point and the ink is transferred onto the paper forming printed image 5. The image 5 shown in the picture is a solid filled rectangle. The previously printed sheet of paper 8 moves over the top of linear magnetic assembly 6 with permanent magnets 7 immediately after completion of the printing. Designs of hardware for linear magnetic effects had been described in the aforementioned patents. According to these patents and applications, when passed through the field, the magnetic particles become aligned in the direction of the lines of a magnetic field. As a result, in one example a linear "rolling bar" optical effect 9 appears in the print. This is shown and described in United States Patent application 20050106367, in the name of Raksha et al., filed Dec. 22, 2004 incorporated herein by reference.

Referring once again to FIG. 1, as printed sheets of, for example, banknotes are rapidly conveyed from the impression cylinder 3 to a stacking unit, the sheets are exposed to high volumes of ambient air. One result of this air is to affect an almost immediate surface drying reaction. From the time optically variable ink is printed to the time the sheets are stacked, which is generally less than one minute, the ink viscosity increases rapidly, and the sheets can be stacked without offsetting. It is preferred that this print-to-stack duration be held below 5 minutes to minimize the number of sheets in transit.

In order for the magnetic orientation steps to be compatible with the high-speed printing process characteristics, it is advantageous for the ink to contain either additional or slower drying solvents to keep the ink layer fluid during transit through the magnetic zone. If printing roller 1 is also heated to lessen the viscosity of the paste-like ink, these slower drying solvents are formulated to contain fewer light fractions that "flash off", allowing more solvent to remain in the deposited layer. Utilization of a cure retarder, such as clove oil and others, provides additional methods to prevent the ink surface from skinning over prior to the sheet reaching the magnet apparatus.

The three examples below and accompanying tables, clearly show the benefit of adding oil and simultaneously adding thermal energy in the form of heat to lessen the viscosity of the ink while applying the magnetic field.

Example 1

7.25 g of paste-like ink vehicle by Supplier #1 was mixed with 2.5 g of optically-variable pigment and diluted with Flash Oil in two different concentrations. Viscosity of the paste like ink, measured at two different temperatures, depends on content of the oil and the temperature as shown below:

| Diluent | % Diluent | Viscosity at 25° C. and shear rate of 5.7 $s^{-1}$ | Viscosity at 50 C. and shear rate of 5.7 $s^{-1}$ |
|---|---|---|---|
| 1 g Flash Oil | 9.3% | 62 | 8 |
| 1.5 g Flash Oil | 13.3% | 43 | 8 |

Example 2

7.5 g of viscous paste-like ink vehicle by Supplier #2 was mixed with 2.5 g of optically-variable pigment and diluted with Flash Oil in two different concentrations. Viscosity of the paste like ink, measured at 25° C. and 50° C., depends on content of the oil and the temperature as shown below:

| Diluent | % Diluent | Viscosity at 25° C. and shear rate of 5.7 $s^{-1}$ | Viscosity at 50° C. and shear rate of 5.7 $s^{-1}$ |
|---|---|---|---|
| 1 g Flash Oil | 9.1% | 64 | 32 |
| 1.5 g Flash Oil | 13.0% | 44 | 25 |

Example 3

A viscous paste-like ink vehicle by Supplier #2 was mixed with a optically-variable pigment and diluted with oil. Viscosity of diluted and non-diluted inks, measured at 25° C. and 40° C., depends on content of the oil and the temperature as shown below:

| Resin | Pigment | Diluent | % Diluent | Viscosity at 25° C. and shear rate of 5.7 $s^{-1}$ | Viscosity at 40° C. and shear rate of 5.7 $s^{-1}$ |
|---|---|---|---|---|---|
| 7.15 g | 2.5 g | none | 0.0% | 200 | In the range of 50-80 |
| 8.41 g | 2.95 g | 0.6 g 500 Oil | 5.0% | 130 | 58 |

Figure 2:
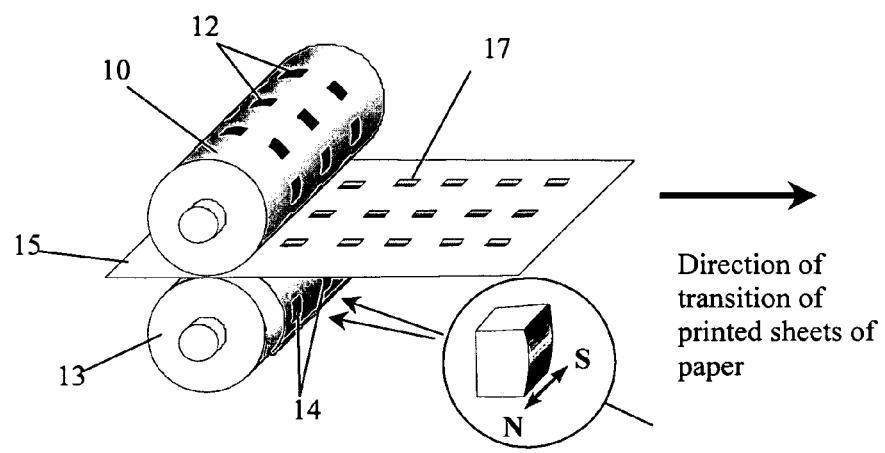
FIG. 2 is a schematic diagram similar to that of FIG. 1 wherein magnets for providing a magnetic field for aligning flakes within the past like viscous ink are provided within an impression roller.

In a second embodiment shown in FIG. 2, the steps of ink transfer and magnetic imaging occur almost simultaneously. Again, a non-magnetic printing cylinder 10, that includes image engravings 12, is heated to lessen the viscosity of the ink during the printing step. The non-magnetic impression roller 13 creates enormous nip pressures onto the non-magnetic printing cylinder 10 during the ink transfer. The impression cylinder 13 includes a series of embedded magnets 14 with polarity 16 at prescribed intervals matching the engraving pattern 12 and repeat of the cylinder 10. Both cylinders rotate in opposite directions. Sheet of paper 15 is fed between the cylinders causing the image 17 to be transferred from the engravings onto the paper the moment when both cylinders are in the nearest contact with each other. At the precise moment of ink transfer, the surfaces of the magnetic elements 14 are coincident with the recessed engravings of the image engravings 12. As the ink layer splits from the engraving, the magnetic field emanating from each element 14 interacts with the magnetic pigment particles in the ink causing re-orientation of the particles along the lines of the applied magnetic field. As a result of the re-orientation and alignment, the printed image 17 already has a magnetic illusionary effect of a rolling bar. Since the dwell times of ink in the magnetic field envisioned in this embodiment are considerably shorter than the previously described embodiment of FIG. 1, additional rheology modifiers may be needed to balance a drop in viscosity while maintaining proper tack without affecting the ink split characteristics.

Figure 3:
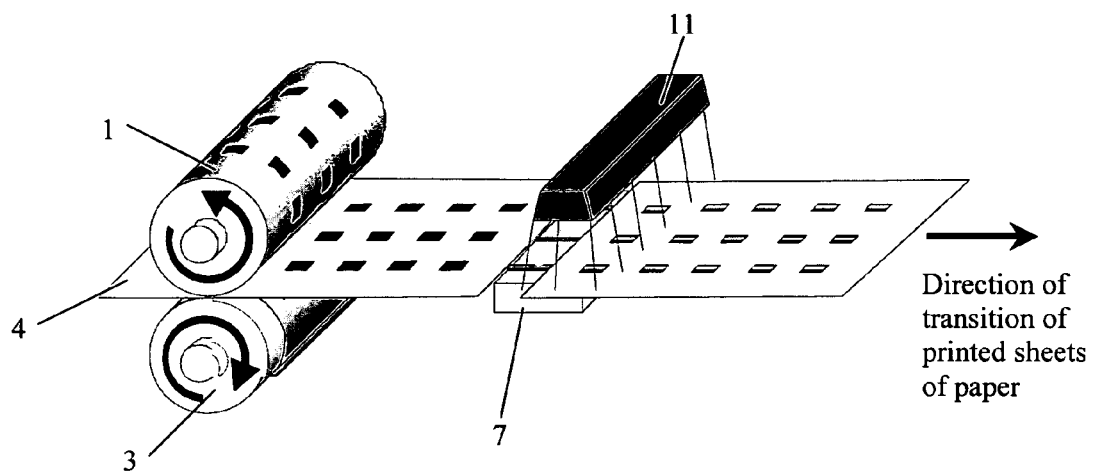
FIG. 3 is a schematic diagram similar to that of FIG. 1 wherein a UV curing source is provided directly over the flake alignment magnets.

Referring now to FIG. 3, a similar configuration to that of FIG. 1 is shown, however the printing press is slightly different and is designed for printing of magnetic UV-curable optically variable ink. Similar to FIG. 1, a sheet of paper 4 is printed between the rollers 1 and 3 and moves to the magnetic stage 7. In accordance with this invention, the ink maintains some flow ability when it reaches the magnetic field. Within the ink, magnetic particles align themselves along magnetic lines in the field on the top of the magnetic stage. In order to freeze the magnetic flakes while still in the magnetic field, a UV light source or electron beam unit 11 is mounted opposite to the alignment magnets and is switched on after the flakes are aligned. Alternatively, the UV light source can be positioned near the magnetic stage 7. As the substrate continues to move, it arrives at the curing zone of the curing source 11 and the ink solidifies fixing the magnetic flakes in the preferred tilted position in dependence upon the field lines. It should be appreciated that UV-curable ink can also be used in the embodiment of FIG. 2, by positioning a UV light source so to cure the ink immediately after the ink splits from the engraving.

Figure 4:
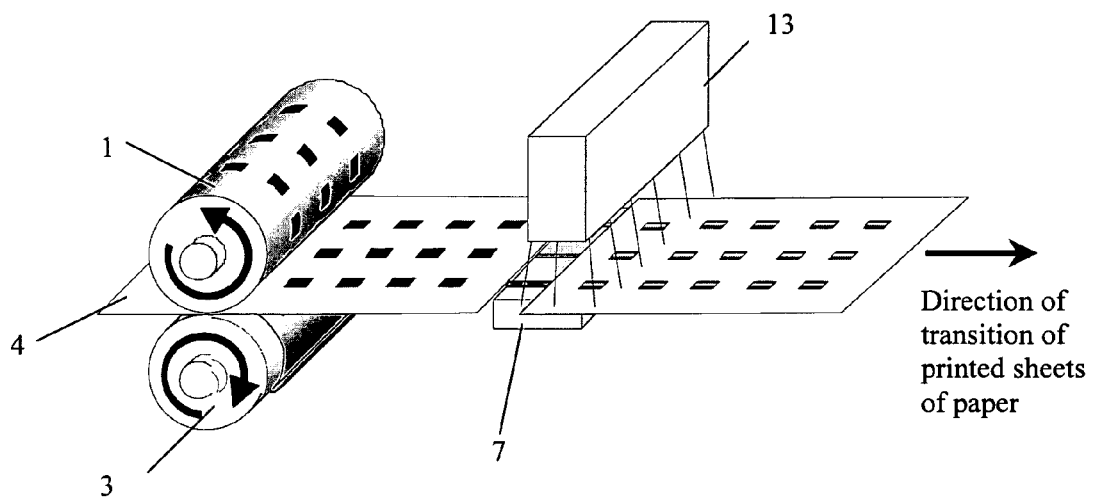
FIG. 4 is a schematic diagram similar to FIG. 3, wherein a heat source is provided directly over the alignment magnets.

Another embodiment displayed in FIG. 4 is similar to that of FIG. 1. In FIG. 4 heat energy is applied to the ink and to the paper when they are located over the magnets rather than at the printing rollers. The heat source 13 is installed downstream of the rollers and is oriented so as to be facing the magnetic field.

The energy source 13 heats the printed element reducing the ink viscosity sufficiently such that the flakes are able to align following lines of the magnetic field. Of course various means of supplying energy are possible. Energy transfer can be accomplished via radiation, conduction or convection. Heat transfer may be provided with steam, hot air, infrared irradiation, microwave, radio frequency induction, light energy or any other suitable method. By way of example infrared (IR) irradiation may be used. The essential aspect of this invention is that the energy acts to lessen the viscosity of the paste-like printing ink, so that the ink is compatible with a flake alignment process such as magnetic field alignment of magnetically alignable flakes.

Employing an embodiment similar to that shown in FIG. 4, convection was used as the method of viscosity reduction to facilitate flake alignment. In this example, a multi-step process was employed for the production of printed sheets:

A paste-like oxidative-cure ink was prepared that incorporated particles of optically variable interference pigment containing a magnetic layer.

The ink was applied to high-quality bond paper sheet substrates using an engraved plate and a laboratory Intaglio press.

The printed paper sheets were transported singly on a conveyor system at speeds between 50 and 200 ft/min.

Air heated to approximately 300 degrees C. was directed at the printed sheet at the position just upstream of the magnets in order to cause a reduction of viscosity in the ink more than 60%.

Immediately after the application of heat, the uncured ink passed over a line of NdFeB magnets of dimension 4.0 inches×1.5 inches×0.25 inches. The line of magnets included two of these 4.0" long magnets oriented lengthwise to provide a total length of 8.0 inches in the direction of travel. Exposure of the printed image having ink of reduced viscosity to the magnetic field caused alignment of the flakes into an arched pattern running down the length of the image.

The printed sheets were carried by the conveyor out of the heat and magnet zones in order for the oxidative curing to take place.

Although in the previous example, a 60% reduction in viscosity was sufficient to allow alignment of the flakes in the field, in other instances depending upon the viscosity of the ink, a reduction of viscosity of more than 80% is preferable.

Figure 5:
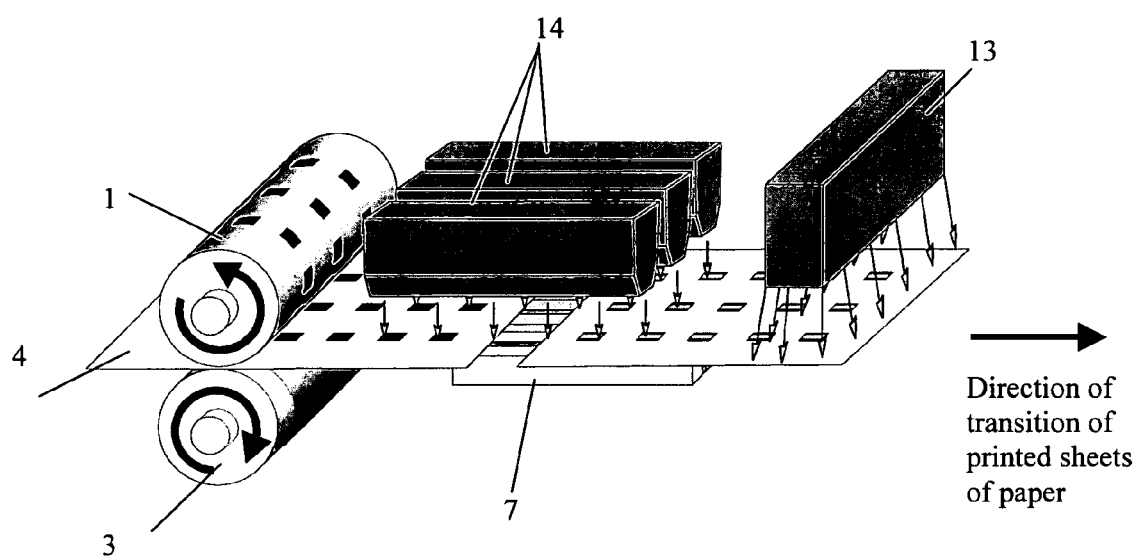
FIG. 5 is a schematic diagram similar to that of FIG. 2 wherein a sheet of paper 4 is printed between the rollers wherein a printed image moves to the magnetic stage having heating elements adjacent thereto.

Another embodiment displayed in FIG. 5 is similar to that of FIG. 4.

Referring now to FIG. 5, a sheet of paper 4 is printed between the rollers 1 and 3 and moves to the magnetic stage 7. Heating elements 14 are mounted above the magnetic stage 7 at the distance from 0.0625" to 1.5". The elements 14 heat the paper and the ink to reduce the ink viscosity to the level providing alignment of magnetic particles in the field of the stage 7. The elements 14 are usually longer than the stage 7 because they need to start to heat the ink before it comes to the stage 7. The UV-light source 13 is installed shortly after magnetic stage 7 in order to fix position of already aligned particles in the volume of the ink and to cure the ink vehicle.

Of course numerous other embodiments may be envisaged, without departing from the spirit and scope of the invention

What is claimed is:

1. A method of forming an image on a substrate, the image providing an optical effect caused by an alignment of flakes within the image, the method comprising the steps of:
    a) printing a viscous paste ink onto the substrate, the viscous paste ink comprising a carrier having flakes therein, wherein the flakes are optical interference pigment flakes, or reflective pigment flakes, or single layer diffractive flakes, or multi layer diffractive flakes, and wherein the flakes comprise at least a layer of field orientable material;
    b) after step (a), lessening the viscosity of the paste ink by adding energy to the paste ink printed on the substrate, wherein a configuration of the paste ink printed on the substrate is maintained;
    c) after the viscosity of the paste ink is lessened, applying a magnetic or electric field so as to reorient the flakes within the paste ink and to provide the alignment of the flakes such that some of the flakes are standing on their edges or tilted thereby enabling the optical effect; and,
    d) fixing the alignment of the flakes within the paste ink on the substrate; wherein the paste ink remains a paste during steps (a)-(c).

2. A method as defined in claim 1, wherein the paste ink has a viscosity V of at least 100 Pa·s when at a temperature of between 15 and 25 degrees C.

3. A method as defined in claim 1, wherein the step of lessening the viscosity includes decreasing the viscosity V of the paste ink by at least 60% for at least a time sufficient for applying the magnetic or electric field to the paste ink, so as to allow the flakes to align within the paste ink along field lines of the magnetic or electric field.

4. A method as defined in claim 1, wherein in step (b) the viscosity V is decreased by at least 80%.

5. A method as defined in claim 1, wherein the step of lessening the viscosity V of the paste ink comprises the step of heating the paste ink after step (a).

6. A method as defined in claim 5, wherein the step of heating the paste ink is performed by heating the substrate.

7. A method as defined in claim 5, wherein the ink is printed on the substrate using a printing roller and an impression roller and wherein the step of heating is performed by applying heat downstream from the printing roller.

8. A method as defined in claim 5, wherein the step of heating includes passing the substrate along a heated element.

9. A method as defined in claim 1, wherein the viscosity of the paste ink is lessened after printing the paste ink on the substrate, proximate to where the printing occurs.

10. A method as defined in claim 1 wherein the step of fixing includes curing the paste ink after the magnetic flakes have been aligned in step (c).

11. A method as defined in claim 10, wherein the curing step involves a first portion of less than 5 minutes in which surface drying occurs followed by a second portion in which a sub-surface cures.

12. A method as defined in claim 10, wherein the step of curing includes irradiation the ink with UV light or ebeam right after a heating of the ink.

13. A method as defined in claim 10, wherein the step of curing includes the step of irradiating the ink with UV light.

14. A method as defined in claim 10, wherein the step of curing includes the step of irradiating the ink with an electron beam.

15. A method as defined in claim 1, wherein the paste ink includes slow drying solvents and/or a cure retarder.

* * * * *